(12) United States Patent
Inda

(10) Patent No.: US 7,998,622 B2
(45) Date of Patent: Aug. 16, 2011

(54) ALL SOLID LITHIUM ION SECONDARY BATTERY AND A SOLID ELECTROLYTE THEREFOR

(75) Inventor: Yasushi Inda, Sagamihara (JP)

(73) Assignee: Kabushiki Kaisha Ohara, Sagamihara-shi (JP)

( * ) Notice: Subject to any disclaimer, the term of this patent is extended or adjusted under 35 U.S.C. 154(b) by 1275 days.

(21) Appl. No.: 10/579,242

(22) PCT Filed: Dec. 1, 2005

(86) PCT No.: PCT/JP2005/022506
§ 371 (c)(1),
(2), (4) Date: May 12, 2006

(87) PCT Pub. No.: WO2006/059794
PCT Pub. Date: Jun. 8, 2006

(65) Prior Publication Data
US 2007/0048619 A1     Mar. 1, 2007

(30) Foreign Application Priority Data
Dec. 2, 2004   (JP) .................................. 2004-350315

(51) Int. Cl.
*H01M 10/36* (2010.01)

(52) U.S. Cl. .................... 429/322; 429/231.1; 429/231.5

(58) Field of Classification Search .......................... None
See application file for complete search history.

(56) References Cited

U.S. PATENT DOCUMENTS

| | | | |
|---|---|---|---|
| 5,139,899 | A | 8/1992 | Kadono et al. |
| 5,702,995 | A | 12/1997 | Fu |
| 6,030,909 | A | 2/2000 | Fu |
| 6,165,646 | A | 12/2000 | Takada et al. |
| 6,315,881 | B1 | 11/2001 | Fu |
| 6,485,622 | B1 | 11/2002 | Fu |
| 7,211,532 | B2 | 5/2007 | Fu |
| 2003/0142466 | A1 | 7/2003 | Yamada et al. |
| 2003/0224244 | A1 | 12/2003 | Inda et al. |
| 2004/0081891 | A1 | 4/2004 | Yamaguchi et al. |
| 2004/0106046 | A1* | 6/2004 | Inda .............................. 429/322 |

FOREIGN PATENT DOCUMENTS

| | | |
|---|---|---|
| EP | 1 424 743 A1 | 6/2004 |
| JP | 2001-15153 | 1/2001 |
| JP | 2001-43892 | 2/2001 |
| JP | 2001-68149 | 3/2001 |

(Continued)

OTHER PUBLICATIONS

Chinese Office Action dated Sep. 19, 2009, issued in corresponding Chinese Patent Application No. 2005800469808.
Taiwanese Office Action dated Feb. 20, 2008, issued in corresponding Taiwanese Patent Application No. 094142300.

(Continued)

*Primary Examiner* — John S Maples
(74) *Attorney, Agent, or Firm* — Westerman, Hattori, Daniels & Adrian, LLP (57) ABSTRACT

An all solid type lithium ion secondary battery which has high heat resistance and can be used over a broad temperature range, has a high battery capacity and an excellent charging-discharging characteristic, and can be used stably for a long period of time includes an inorganic substance including a lithium ion conductive crystalline and is substantially free of an organic substance and an electrolytic solution. The inorganic substance comprising a lithium ion conductive crystalline preferably is lithium ion conductive glass-ceramics.

20 Claims, 2 Drawing Sheets

FOREIGN PATENT DOCUMENTS

| | | |
|---|---|---|
| JP | 2001-155763 | 6/2001 |
| JP | 2001-210374 | 8/2001 |
| JP | 2001-243984 | 9/2001 |
| JP | 2002-42876 | 2/2002 |
| JP | 3433173 B2 | 8/2003 |
| JP | 2003-346896 | 12/2003 |
| JP | 2004-185862 A | 7/2004 |
| KR | 2003-0093976 A | 12/2003 |
| TW | 2004-23452 A | 11/2004 |

OTHER PUBLICATIONS

International Search Report of PCT/JP2005/022506, date of mailing May 29, 2006.

Notification Concerning Transmittal of International Preliminary Report on Patentability (Form PCT/IB/326) of International Application No. PCT/JP2005/022506 mailed Jun. 14, 2007, with Forms PCT/IB/373 and PCT/ISA/237.

* cited by examiner

ALL SOLID LITHIUM ION SECONDARY BATTERY AND A SOLID ELECTROLYTE THEREFOR

This application is a 371 of PCT/JP05/22506, filed 1 Dec. 2005, which claims priority from Japanese 2004-350315, filed 2 Dec. 2004.

TECHNICAL FIELD

This invention relates to a solid electrolyte suitable for use in a lithium ion secondary battery and a lithium ion secondary battery using this solid electrolyte.

BACKGROUND OF THE INVENTION

In the past, an electrolyte in which a film having micropores called a separator was impregnated with a non-aqueous electrolytic solution was generally used. A lithium ion secondary battery called a polymer battery employing a polymer electrolyte made of a polymer has recently attracted more attention than such electrolyte employing liquid.

This polymer battery uses an electrolyte made in the form of gel in which the polymer is impregnated with a liquid electrolytic solution. Since it holds a liquid electrolytic solution in the polymer, it has the advantages that there is little possibility of leakage of the liquid and, therefore, safety of the battery is improved and that it has more freedom in adopting the configuration of the battery.

Since lithium ion conductivity of such polymer electrolyte is lower than an electrolyte containing only an electrolytic solution, there has occurred a practice to reduce thickness of the polymer electrolyte. There, however, has arisen a problem in such polymer electrolyte whose thickness is reduced that, since its mechanical strength is reduced, the polymer electrolyte tends to be broken or give rise to a hole during production of the battery resulting in short-circuiting between the positive electrode and the negative electrode.

It has, therefore, been proposed, as disclosed by Japanese Patent Application Laid-open Publication No. 6-140052, to provide a solid electrolyte by adding an inorganic oxide such as alumina to the electrolyte and thereby increase its mechanical strength. As such inorganic oxide, inorganic oxides other than alumina such as silica and lithium aluminate have also been proposed.

However, the addition of such inorganic oxides such as alumina to an electrolyte causes the problem that lithium ion conductivity in the solid electrolyte is significantly reduced. Moreover, when charging and discharging are repeated in a lithium ion secondary battery employing this solid electrolyte, the electrolyte reacts with such inorganic oxide resulting in deterioration in the charging-discharging characteristic of the lithium ion secondary battery.

Furthermore, the lithium ion secondary battery comprising a polymer electrolyte cannot avoid thermal expansion and contraction and abrupt change in ion conductivity caused by change in temperature due to characteristics of the polymer used in the electrolyte. Therefore, the lithium ion secondary battery comprising such polymer solid electrolyte has poor heat resistance and cannot be used over a broad temperature range.

It is, therefore, an object of the present invention to provide an all solid state lithium ion secondary battery which has high heat resistance and can be used over a broad temperature range, has a high battery capacity and an excellent charging-discharging characteristic, and can be used stably for a long period of time.

It is another object of the invention to provide a solid electrolyte used in this lithium ion secondary battery.

SUMMARY OF THE INVENTION

The inventor of the present invention has found, which has led to the present invention, that, for achieving the objects of the present invention, it is important for the battery not to contain an electrolytic solution in a solid electrolyte from the standpoint of safety of the battery and also not to contain an organic substance in the solid electrolyte from the standpoint of improving heat resistance. Further, as a result of studies and experiments about a solid electrolyte and a lithium ion secondary battery which will be sufficiently practicable under these conditions, the inventor has found that, by comprising an inorganic substance comprising a lithium ion conductive crystalline, particularly lithium ion conductive glass-ceramics, having a specific composition or by comprising an inorganic substance comprising lithium ion conductive crystalline, particularly lithium ion conductive glass-ceramics, in a positive electrode and/or a negative electrode of a lithium ion secondary battery utilizing such solid electrolyte, an all solid state lithium ion secondary battery which, as compared with the prior art solid electrolytic type battery, has high heat resistance and can be used over a wide temperature range, has a high battery capacity and an excellent charging-discharging characteristic, and can be used stably for a long period of time, and a solid electrolyte used for such battery, can be provided.

In the first aspect of the invention, there is provided a solid electrolyte comprising an inorganic substance comprising a lithium ion conductive crystalline and being substantially free of an organic substance and an electrolytic solution.

In the second aspect of the invention, there is provided a solid electrolyte as defined in the first aspect wherein the inorganic substance comprising a lithium ion conductive crystalline is substantially free of a pore or a crystal grain boundary which obstructs ion conduction.

In the present specification, "a pore or a crystal grain boundary which obstructs ion conduction" means factors obstructing ion conduction including a pore or a crystal grain boundary which reduces ion conductivity of the entire inorganic substance including a lithium ion conductive crystal to one tenths or below of ion conductivity of the lithium ion conductive crystalline contained in the inorganic substance.

In the third aspect of the invention, there is provided a solid electrolyte as defined in the first aspect wherein the inorganic substance comprising a lithium ion conductive crystalline is lithium ion conductive glass-ceramics.

In the fourth aspect of the invention, there is provided a solid electrolyte as defined in the first aspect comprising an inorganic substance powder comprising a lithium ion conductive crystalline or lithium ion conductive glass-ceramics powder and an inorganic substance comprising Li.

In the fifth aspect of the invention, there is provided a solid electrolyte as defined in the fourth aspect wherein the inorganic substance powder comprising a lithium ion conductive crystalline or lithium ion conductive glass-ceramics powder has ion conductivity of $10^{-4} SCm^{-1}$ or over, has an average particle diameter of 9 μm or below, and is contained in the solid electrolyte in an amount within a range from 50 mass % to 95 mass %.

In the sixth aspect of the invention, there is provided a solid electrolyte as defined in the third aspect wherein the ion conductive glass-ceramics are in the form of a thin plate.

In the seventh aspect of the invention, there is provided a solid electrolyte as defined in the sixth aspect wherein the lithium ion conductive glass-ceramics have a thickness within a range from 15 μm to 200 μm.

In the eighth aspect of the invention, there is provided a solid electrolyte as defined in the first aspect having ion conductivity which is $10^{-5} SCm^{-1}$ or over.

In the ninth aspect of the invention, there is provided a solid electrolyte as defined in the first aspect wherein the inorganic substance comprising a lithium ion conductive crystalline or lithium ion conductive glass-ceramics has a predominant crystal phase of $Lii+_x+yAl\chi Ti_2-\chi Si_yP_3-yOi_2$ where $0 \leq x \leq 1$ and $0 \leq y \leq 1$.

In the tenth aspect of the invention, there is provided a solid electrolyte as defined in the first aspect wherein the inorganic substance comprising a lithium ion conductive crystalline or lithium ion conductive glass-ceramics comprises, in mol %;

| | |
|---|---|
| $Li_2O$ | 12-18% |
| $Al_2O_3 + Ga_2O_3$ | 5-10% |
| $TiO_2 + GeO_2$ | 35-45% |
| $SiO_2$ | 1-10% and |
| $P_2O_5$ | 30-40%. |

In the eleventh aspect of the invention, there is provided a solid electrolyte as defined in the first aspect wherein the inorganic substance comprising a lithium ion conductive crystalline or lithium ion conductive glass-ceramics comprises, in mass %:

| | |
|---|---|
| $Li_2O$ | 3-10% |
| $Al_2O_3 + Ga_2O_3$ | 5-20% |
| $TiO_2 + GeO_2$ | 25-40% |
| $SiO_2$ | 0.5-8% and |
| $P_2O_5$ | 40-55%. |

In the twelfth aspect of the invention, there is provided a lithium ion secondary battery comprising a solid electrolyte as defined in any of the first to eleventh aspect.

In the thirteenth aspect of the invention, there is provided a lithium ion secondary battery as defined in the twelfth aspect comprising an inorganic substance comprising a lithium ion conductive crystalline in a positive electrode and/or a negative electrode.

In the fourteenth aspect of the invention, there is provided a lithium ion secondary battery as defined in the thirteenth aspect wherein the inorganic substance comprising a lithium ion conductive crystalline contained in the positive electrode and/or the negative electrode is substantially free of a pore or a crystal grain boundary which obstructs ion conduction.

In the fifteenth aspect of the invention, there is provided a lithium ion secondary battery as defined in the thirteenth aspect wherein the inorganic substance comprising a lithium ion conductive crystalline contained in the positive electrode and/or the negative electrode is a lithium ion conductive glass-ceramics.

In the sixteenth aspect of the invention, there is provided a lithium ion secondary battery as defined in the thirteenth aspect wherein an average particle diameter of the inorganic substance comprising a lithium ion conductive crystalline or lithium ion conductive glass-ceramics contained in the positive electrode and/or the negative electrode is ⅕ or below of an average particle diameter of an active material of the positive electrode and/or the negative electrode comprising an inorganic substance comprising a lithium ion conductive crystallize or lithium ion conductive glass-ceramics.

In the seventeenth aspect of the invention, there is provided a lithium ion secondary battery as defined in the thirteenth aspect wherein an amount of the inorganic substance comprising a lithium ion conductive crystalline or lithium ion conductive glass-ceramics contained in the positive electrode and/or the negative electrode is 2-35 mass % of an active material of the positive electrode and/or the negative electrode.

In the eighteenth aspect of the invention, there is provided a lithium ion secondary battery as defined in the thirteenth aspect wherein the inorganic substance comprising a lithium ion conductive crystalline or lithium ion conductive glass-ceramics contained in the positive electrode and/or the negative electrode comprises, in mol %;

| | |
|---|---|
| $Li_2O$ | 12-18% |
| $Al_2O_3 + Ga_2O_3$ | 5-10% |
| $TiO_2 + GeO_2$ | 35-45% |
| $SiO_2$ | 1-10% and |
| $P_2O_5$ | 30-40%. |

In the nineteenth aspect of the invention, there is provided a lithium ion secondary battery as defined in the thirteenth aspect wherein the inorganic substance comprising a lithium ion conductive crystalline or lithium ion conductive glass-ceramics contained in the positive electrode and/or the negative electrode comprises, in mass %;

| | |
|---|---|
| $Li_2O$ | 3-10% |
| $Al_2O_3 + Ga_2O_3$ | 5-20% |
| $TiO_2 + GeO_2$ | 25-40% |
| $SiO_2$ | 0.5-8% and |
| $P_2O_5$ | 40-55%. |

In the twentieth aspect of the invention, there is provided a lithium ion secondary battery as defined in the thirteenth aspect wherein the inorganic substance comprising a lithium ion conductive crystalline or lithium ion conductive glass-ceramics contained in the positive electrode and/or the negative electrode has a predominant crystal phase of $Lii+_x+yAl\chi Ti_2-_xSiyP_3-yOi_2$ where $0 \leq x \leq 1$ and $0 \leq y \leq 1$.

In the twenty-first aspect of the invention, there is provided a lithium ion secondary battery as defined in any of the thirteenth to seventeenth aspect which comprises, in the positive electrode and/or the negative electrode, the same inorganic substance or the same glass-ceramics as the inorganic substance comprising a lithium ion conductive crystalline or lithium ion conductive glass-ceramics contained in the solid electrolyte.

According to the invention, by comprising an inorganic substance comprising a lithium ion conductive crystalline, particularly lithium ion conductive glass-ceramics, having a specific composition or by comprising an inorganic substance comprising a lithium ion conductive crystalline, particularly lithium ion conductive glass-ceramics, in a positive electrode and/or a negative electrode of a lithium ion secondary battery utilizing such solid electrolyte, an all solid state lithium ion secondary battery which, as compared with the prior art solid electrolytic type battery, has high heat resistance and can be used over a wide temperature range, has a high battery capacity and an excellent charging-discharging characteristic, and can be used stably for a long period of time, and a solid electrolyte used for such battery, can be provided.

BRIEF DESCRIPTION OF THE INVENTION

In the accompanying drawings.

DESCRIPTION OF PREFERRED EMBODIMENTS

Description will now be made about preferred embodiments of the invention with reference to the accompanying drawings.

The solid electrolyte of the present invention is substantially free of an organic substance and an electrolytic solution either. By adopting this structure, a risk due to leakage of liquid can be eliminated. Moreover, by adopting this structure, thermal expansion and contraction due to temperature change can be reduced and an abrupt change in conduction can be eliminated and, since the heat resistant temperature is elevated, the solid electrolyte can be used over a wider temperature range.

Accordingly, a lithium ion conductive substance used in the solid electrolyte of the invention should preferably be an inorganic substance. Among inorganic substances, glass-ceramics are particularly preferable because they are material which is substantially free of a pore or a crystal grain boundary in a crystal grain or between crystal grains and exhibits excellent ion conductivity.

In the present specification, the phrasing "being substantially free of an organic substance and an electrolytic solution" means that an organic substance or an electrolytic solution is not intentionally added to the solid electrolyte and includes a case where an organic substance or an electrolytic solution is unintentionally mixed as an impurity and a case where an organic substance or an electrolytic solution is added in a step during manufacturing of the solid electrolyte and, notwithstanding that such organic substance or electrolytic solution should be removed in a subsequent step of the manufacturing process, trace of such organic substance or electrolytic solution unintentionally remains unremoved after the manufacturing process.

In the present specification, "glass-ceramics" means a material which consists of an amorphous solid and crystalline and is obtained by heating a glass and thereby causing a crystal phase to precipitate in a glass phase of the glass. The glass-ceramics in the present invention includes a material in which a glass phase is completely shifted to a crystal phase on condition that the crystal phase is substantially free of pores in between crystal grains and in crystal grains, i.e., a material in which the amount of crystal (rate of crystallization) is 100 mass %. Ceramics and other sintered materials generally cannot avoid inclusion of pores and crystal grain boundary in between crystal grains and in crystal grains due to the manufacturing process of such ceramics and sintered materials and can be distinguished from glass-ceramics in this respect.

As to ion conduction, in the case of ceramics, ion conductivity of the ceramics becomes lower than ion conductivity of crystal grains constituting the ceramics due to presence of pores and crystal grain boundary in the ceramics. In the case of glass-ceramics, reduction in ion conductivity between crystal grains can be prevented by controlling the crystallization process and same ion conductivity as its crystal grains themselves can be maintained.

Since, as described above, the manufacturing process of a glass-ceramics enables the glass-ceramics to be substantially free of a pore and a crystal grain boundary which obstructs ion conduction in between crystal grains or in crystal grains themselves, the glass-ceramics exhibit a better ion conductivity than general ceramics and other sintered materials.

When the solid electrolyte of the present invention comprising an inorganic substance comprising a lithium ion conductive crystalline or lithium ion conductive glass-ceramics is used as a battery, the thinner the thickness of the solid electrolyte, the shorter is moving distance of the lithium ion and, as a result, a battery of a higher output can be obtained and a larger electrode area per unit volume can be secured resulting in a battery of a higher capacity. For this reason, the thickness of the solid electrolyte comprising a lithium ion conductive glass-ceramics powder should preferably be 60 µm or below, more preferably 50 µm or below and, most preferably 40 βm or below. In case the solid electrolyte is made of a thin plate of glass-ceramics, the thickness of this thin plate becomes the thickness of the solid electrolyte. The thickness of the solid electrolyte in this case should preferably be 200 µm or below, more preferably 150 µm or below, and most preferably, 100 βm or below.

If, however, the solid electrolyte is excessively thin, the mechanical strength of the solid electrolyte is reduced with the result that difficulty arises in handling the solid electrolyte independently during carrying of the solid electrolyte or manufacturing a battery. This is disadvantageous in actual commercial production of a battery. From this standpoint, the thickness of the solid electrolyte should preferably be 15 µm or over, more preferably 20 µm or over and, most preferably 25 µm or over.

Mobility of lithium ion during charging and discharging of a lithium ion secondary battery depends upon lithium ion conductivity and lithium ion transport number of the electrolyte. The ion conductivity of the inorganic substance comprising a lithium ion conductive crystalline or the lithium ion conductive glass-ceramics contained in the solid electrolyte or in the positive and/or negative electrode should preferably be $1 \times 10^{-4}$ S·cm$^{-1}$ or over, more preferably $5 \times 10^{-4}$ S·cm$^{-1}$ or over and, most preferably $1 \times 10^{-3}$ S·cm$^{-1}$ or over. Likewise, the ion conductivity of the solid electrolyte comprising an inorganic substance comprising a lithium ion conductive crystalline or the solid electrolyte comprising lithium ion conductive glass-ceramics should preferably be $1 \times 10^{-5}$ S·cm$^{-1}$ or over, more preferably $5 \times 10^{-5}$ S·cm$^{-1}$ or over and, most preferably $1 \times 10^{-4}$ S·cm$^{-1}$ or over.

As the inorganic substance powder having a high ion conductivity comprising a lithium ion conductive crystalline or the lithium ion conductive glass-ceramics powder having a high ion conductivity respectively contained in the solid electrolyte, powder obtained by crushing the lithium ion conductive inorganic substance comprising a lithium ion conductive crystalline or the lithium ion conductive glass-ceramics is used. Such powder should preferably be dispersed uniformly in the solid electrolyte from the standpoints of ion conductivity of the solid electrolyte and mechanical strength. For enhancing dispersion of such powder and achieving a desired thickness of the solid electrolyte, average particle diameter of the powder should preferably be 9 μm or below, more preferably 6 μm or below and, most preferably 3 μm or below.

The lithium ion conductive glass-ceramics contained in the solid electrolyte of the invention or the lithium ion conductive glass-ceramics contained in the positive and/or negative electrode of a lithium ion secondary battery of the invention is made by heat treating a $Li_2O-Al_2O_3-TiO_2-SiO_2-P_2O_5$ mother glass for crystallization and has a predominant crystal phase of $Li_{1+x+y}Al_xTi_{2-x}Si_yP_{3-y}O_{12}$ ($0 \leq x \leq 1$, $0 \leq y \leq 1$). From the standpoint of achieving excellent ion conductivity, x and y should preferably be $0 \leq x \leq 0.4$, $0 \leq y \leq 0.6$, and most preferably $0.1 \leq x \leq 0.3$, $0.1 \leq y \leq 0.4$.

The inorganic substance comprising a lithium ion conductive crystalline contained in the solid electrolyte of the invention or the inorganic substance comprising a lithium ion conductive crystalline contained in the positive electrode and/or the negative electrode of the lithium ion secondary battery of the present invention has, as its predominant crystal phase, a crystal phase of $Li_{1+x+y}Al_xTi_{2-x}Si_yP_{3-y}O_{12}$ where x and y are $0 \leq x \leq 1$ and $0 \leq y \leq 1$. From the standpoint of excellent ion conductivity, x and y should more preferably be $0 \leq x \leq 0.4$ and $0 < y \leq 0.6$ and, most preferably, $0.1 \leq x \leq 0.3$ and $0.1 < y \leq 0.4$.

Composition ratios expressed in mol % and results thereof of respective components constituting the lithium ion conductive glass-ceramics contained in the solid electrolyte or the positive electrode and/or the negative electrode of the lithium ion secondary battery of the present invention will now be specifically described.

$Li_2O$ is an indispensable component for providing $Li^+$ ion carrier and thereby imparting the glass-ceramics with lithium ion conductivity. For achieving an excellent ion conductivity, the lower limit of the amount of this component should preferably be 12%, more preferably be 13% and, most preferably be 14%. The upper limit of the amount of this component should preferably be 18%, more preferably be 17% and, most preferably be 16%.

$Al_2O_3$ is effective for improving thermal stability of the mother glass and also for providing $Al^{3+}$ ion as a solid solution in the above described crystal phase and thereby improving lithium ion conductivity. For achieving these effects, the lower limit of the amount of this component should preferably be 5%, more preferably be 5.5% and, most preferably be 6%. If, however, the amount of this component exceeds 10%, thermal stability of the glass is deteriorated rather than is improved and ion conductivity of the glass-ceramics is reduced. Therefore, the upper limit of the amount of this component should preferably be 10%, more preferably be 9.5% and, most preferably be 9%.

$TiO_2$ and $GeO_2$ contribute to forming of the glass and also constitute the above described crystal phase. In both the glass and the glass-ceramics, these components can be continuously replaced by each other. For vitrification, at least one of these components must be added and, for causing the above described crystal phase to precipitate as a predominant crystal phase and thereby improving ion conductivity, the lower limit of the total amount of these components should preferably be 35%, more preferably be 36% and, most preferably be 37%. The upper limit of the total amount of these components should preferably be 45%, more preferably be 43% and, most preferably be 42%.

$SiO_2$ is effective for improving thermal stability of the mother glass and also for providing $Si^{4+}$ ion as a solid solution in the above described crystal phase and thereby improving lithium ion conductivity. For achieving these effects sufficiently, the lower limit of the amount of this component should preferably be 1%, more preferably be 2% and, most preferably be 3%. If, however, the amount of this component exceeds 10%, ion conductivity of the glass-ceramics is reduced rather than is improved. Therefore, the upper limit of the amount of this component should preferably be 10%, more preferably be 8% and, most preferably be 7%.

$P_2O_5$ is an indispensable component as a glass former and also is a component which constitutes the above described crystal phase. If the amount of this component is less than 30%, difficulty arises in vitrification. Therefore, the lower limit of the amount of this component should preferably be 30%, more preferably be 32% and, most preferably be 33%. If the amount of this component exceeds 40%, difficulty arises in the precipitation of the above described crystal phase in the glass. Therefore, the upper limit of the amount of this component should preferably be 40%, more preferably be 39% and, most preferably be 38%.

The composition ratios of the above described respective components can be expressed in mass % below for achieving the same effects as those described above with respect to the composition ratios expressed in mol %.

As to $Li_2O$, the lower limit of the amount of this component should preferably be 3 mass %, more preferably be 4 mass % and, most preferably be 5 mass %. The upper limit of the amount of this component should preferably be 10 mass %, more preferably be 9 mass % and, most preferably be 8 mass %.

As to $Al_2O_3$, the lower limit of the amount of this component should preferably be 5 mass % more preferably be 6 mass % and, most preferably be 7 mass %. The upper limit of the amount of this component should preferably be 20 mass %, more preferably be 19 mass % and, most preferably be 18 mass %.

As to $TiO_2$ and $GeO_2$, the lower limit of the total amount of these components should preferably be 25 mass %, more preferably be 26 mass % and, most preferably be 27 mass %. The upper limit of the total amount of these components should preferably be 40 mass %, more preferably be 39 mass % and, most preferably be 38 mass %. As to $SiO_2$, the lower limit of the amount of this component should preferably be 0.5 mass %, more preferably be 1 mass % and, most preferably be 2 mass %. The upper limit of the amount of this component should preferably be 8 mass %, more preferably be 7 mass % and, most preferably be 6 mass %.

As to $P_2O_5$, the lower limit of the amount of this component should preferably be 40 mass % more preferably be 41 mass % and, most preferably be 42 mass %. The upper limit of the amount of this component should preferably be 55 mass %, more preferably be 54 mass % and, most preferably be 53 mass %.

In the above described composition, a glass can be easily obtained by casting molten glass and glass-ceramics obtained by heat treating this glass have the above described crystal phase and exhibit an excellent lithium ion conductivity.

Aside from the above described composition, in glass-ceramics having a crystal structure similar to the one described above, $Al_2O_3$ can be replaced by $Ga_2O_3$ partly or in whole and $TiO_2$ can be replaced by $GeO_2$ partly or in whole. In the manufacture of the glass-ceramics, other materials may be added in small amounts for lowering the melting point or improving stability of the glass within a range not to deteriorate ion conductivity.

When the solid electrolyte comprises an inorganic substance powder comprising a lithium ion conductive crystalline or lithium ion conductive glass-ceramics powder, it is preferable for the solid electrolyte to comprise simultaneously an inorganic substance comprising Li. This is because the inorganic substance comprising Li plays a role of a binder for combining particles of an inorganic substance including a lithium ion conductive crystalline or glass-ceramics particles together.

As the inorganic substance comprising Li, $Li_8POi$, $LiPOe$, LiI, LiN, $Li2\theta$, $Li2U2$ and LiF can be used.

Particularly, such inorganic substance comprising Li can be softened or melted by adjusting a sintering temperature or atmosphere when it is mixed and sintered with the inorganic substance comprising a lithium ion conductive crystalline or lithium ion conductive glass-ceramics. The softened or melted inorganic substance comprising Li flows into a gap between particles of the inorganic substance and causes particles of the inorganic substance comprising a lithium ion conductive crystalline or the lithium ion conductive glass-ceramics to be bonded strongly together.

If the amount of the highly conductive inorganic substance powder comprising a lithium ion conductive crystalline or the lithium ion conductive glass-ceramics powder in the solid electrolyte is small, the high lithium ion conductivity of the inorganic substance comprising a lithium ion conductive crystalline or the glass-ceramics cannot be exhibited sufficiently in the solid electrolyte. Conversely, if the amount of the inorganic substance comprising a lithium ion conductive crystalline or the glass-ceramics is excessively large, the amount of inorganic substance which functions as a binder becomes relatively small with the result that adhesion of the inorganic substance comprising a lithium ion conductive crystalline or the glass-ceramics and the inorganic substance becomes weak and mobility of lithium ion in the inorganic substance comprising a lithium ion conductive crystalline or the glass-ceramics powder is deteriorated and, moreover, strength of the solid electrolyte is weakened. For this reason, the lower limit of the amount of the inorganic substance powder comprising a lithium ion conductive crystalline or the lithium ion conductive glass-ceramics powder in the solid electrolyte of the present invention should preferably be 50 mass %, more preferably be 60 mass % and, most preferably be 70 mass %. The upper limit of the amount of the inorganic substance powder or the glass-ceramics powder should preferably be 98 mass %, more preferably be 97 mass % and, most preferably be 96 mass %.

The positive electrode of the lithium ion secondary battery of the present invention comprises at least a positive electrode active material to be described later. It should preferably comprise a positive electrode compound and a positive electrode collector. The negative electrode comprises at least a negative electrode active material to be described later. It should preferably comprise a positive electrode compound and a positive electrode collector.

The positive electrode compound and/or the negative electrode compound of the lithium ion secondary battery of the present invention should preferably comprise an active material, an ion conduction additive and/or an electron conduction additive, and a binder for binding them together.

The positive electrode compound and/or the negative electrode compound can be manufactured simply by mixing an active material, ion and electron conduction additives and a binder together in a solvent and drying the mixture. In this specification, this method will hereinafter be called a simple mixing method.

From the standpoint of providing a battery of a higher capacity by reducing the amount of the ion conduction additive, it is preferable to manufacture the positive electrode compound and/or the negative electrode compound not by the simple mixing method but by employing a mixing method according to which an ion conduction additive and/or an electron conduction additive is fixed on the surface of particles of an active material by means of a binder. This method will hereinafter be called a fixing mixing method.

Removal and addition of lithium ion from and to the active materials due to charging and discharging cause change in the volume of the positive compound and the negative compound. Expansion and contraction of the active materials cause gradual stripping off of the electron conduction additive and the ion conduction additive from the active materials with resulting increase in the amount of the active materials in which removal and addition of lithium ion are not possible. This is likely to cause deterioration accompanying the charging-discharging cycles.

By employing the fixing mixing method, fine particles of the electron conduction additive and ion conduction additive are fixed on the surface of the active material by the binder and, therefore, stripping off of the fine particles of the electron conduction additive and the ion conduction additive in case of expansion and contraction of the active material can be prevented and, accordingly, the ion and electron conduction additives can be added without significant deterioration in the capacity accompanying charging and discharging and reduction in the capacity per unit volume and unit weight.

As the fixing mixing method, the following method may preferably be employed. Conduction additives and a binder are mixed into a dispersed liquid in the state of a slurry by using a solvent and this dispersed liquid is poured into or sprayed over an active material which is flowing or rotating at a high speed and, then, the mixture is dried at a temperature above the boiling point of the solvent. In mixing the active material with the conduction additives, the greater the difference in the particle diameters of the conduction additives and the binder, the more often an interactive mixture tends to occur resulting in enhancing the tendency that fine particles of the conduction additives are deposited on each of large particles of the active material and a layer of the conduction additives is thereby formed on the surface of the active material.

The fixing mixing method is not limited to this method. For example, an active material and conduction additives having sufficiently great difference in the particle diameter may be dispersed together with a binder in a solvent and then may be dried by hot air drying or by freeze-drying. The fixing mixing method may also be realized by employing conventional granulation and surface coating techniques.

As the active material used for a positive electrode material of the lithium ion secondary battery of the invention, a transition metal compound which can store and discharge lithium may be used. For example, at least one transition metal compound selected from the group consisting of manganese, cobalt, nickel, vanadium, niobium, molybdenum, titanium, iron and phosphorus may be used. Since most active materials scarcely have electron conductivity and ion conductivity, an electron conduction additive and an ion conduction additive should preferably be used. Such electron conduction additives include, for example, conductive carbon, graphite, carbon fiber, metal powder, metal fiber and electron conductive polymer. Such ion conduction additives include, for example, an ion conductive glass-ceramics and an ion conductive polymer. These electron and ion conduction additives should preferably be added in an amount within a range from 3-35 mass %, more preferably 2.5-30 mass % and, most preferably, 3-25 mass %, to the positive electrode active material.

As the active material used for a negative electrode material of the lithium ion secondary battery of the invention, metal lithium, alloys which can store and discharge lithium such as a lithium-aluminum alloy, and a lithium-indium alloy, transition metal compounds such as titanium arid vanadium, and carbon type materials such as graphite may preferably be used. As an electron conduction additive used when the active material has not sufficient electron conductivity, for example, conductive carbon, graphite, carbon fiber, metal powder, metal fiber and electron conductive polymer may be preferably used. As an ion conduction additive, for example, an ion conductive glass-ceramics, and an ion conductive polymer may preferably be used. These electron and ion conduction additives should preferably be added in an amount within a range from 3-35 mass %, more preferably 2.5-30 mass % and, most preferably, 3-25 mass %, to the negative electrode active material.

When the inorganic substance comprising a lithium ion conductive crystalline or the lithium ion conductive glass-ceramics is added to the positive electrode and/or the negative electrode of the lithium ion secondary battery, it should preferably be in the form of powder.

In case the positive electrode compound and/or the negative electrode compound is made by the simple mixing method, the average particle diameter of the inorganic substance powder comprising a lithium ion conductive crystalline or the lithium ion conductive glass-ceramics powder should preferably be one-fifth or below, more preferably be one-seventh or below and, most preferably be one-tenths or below, of the average particle diameter of the active material of the positive electrode and/or the negative electrode By making the average particle diameter of the inorganic substance powder or the glass-ceramics powder which is an additive sufficiently small as compared with the average particle diameter of the active material, the area of contact of such additive with the active material increases and sufficient ion conductivity can be imparted by addition of such additive in an amount which will not reduce the battery capacity. If the average particle diameter of the inorganic substance powder or the glass-ceramics powder is the same or larger than the average particle diameter of the active material of the positive electrode and/or the negative electrode, a large amount of the inorganic substance powder or the glass-ceramics powder must be added for imparting sufficient ion conductivity to the positive electrode material and/or the negative electrode material. If, for example, the particle diameter is the same, the inorganic substance powder or the glass-ceramics powder in the same amount as or a larger amount than the active material will have to be added. This will necessitate reduction in the amount of the active material in the positive electrode material and/or the negative electrode material with resulting difficulty in achieving a battery of a high capacity.

In the case of manufacturing the positive electrode compound and/or the negative electrode compound by the simple mixing method, the inorganic substance comprising a lithium ion conductive crystalline or the lithium ion conductive glass-ceramics added to the positive electrode or the negative electrode as the ion conductive additive is necessary for imparting the positive electrode compound and/or the negative electrode compound with sufficient ion conductivity for achieving excellent charging and discharging and, therefore, should preferably be added in an amount of 10 mass % or over, more preferably 12 mass % or over and, most preferably 15 mass % or over to the active material of the positive electrode and/or the negative electrode comprising the above described inorganic substance or glass-ceramics. If, however, the amount of the inorganic substance comprising a lithium ion conductive crystalline or the lithium ion conductive glass-ceramics increases, the amount of the active material in the positive electrode compound and/or the negative electrode compound decreases and the battery capacity per unit volume or unit weight is deteriorated. Therefore, the amount of the inorganic substance or glass-ceramics added to the positive electrode and/or the negative electrode should preferably be 35 mass % or below, more preferably be 30 mass % or below and, most preferably be 25 mass % or below.

In the case of manufacturing the positive electrode compound and/or the negative electrode compound by the fixing mixing method, the average particle diameter of the inorganic substance comprising a lithium ion conductive crystalline or the lithium ion conductive glass-ceramics should preferably be one-fifth or below, more preferably one-seventh or below and, most preferably one-tenth or below of the average particle diameter of the active material of the positive electrode and/or the negative electrode. Since a sufficient effect can be achieved with a smaller amount of ion conduction additive than in the case of using the simple mixing method, for realizing a battery of a high capacity, the amount of the ion conduction additive should preferably be 2 mass % or over, more preferably 2.5 mass % or over and, most preferably 3 mass % or over of the amount of active material comprising the inorganic substance or the glass-ceramics of the positive electrode and/or the negative electrode. For maintaining as much as active material as possible, the upper limit of the inorganic substance comprising a lithium ion conductive crystal or the lithium ion conductive glass-ceramics should preferably be 15 mass %, more preferably 12 mass % and, most preferably 10 mass %. The same is the case with the electron conduction additive and, by making the particle diameter of the electron conduction additive smaller, the same or better effect of the electron conduction additive can be achieved with a smaller amount than before.

The inorganic substance comprising a lithium ion conductive crystalline or the ion conductive glass-ceramics added to the positive electrode and the negative electrode should preferably be the same inorganic substance or glass-ceramics as the inorganic substance or glass-ceramics contained in the solid electrolyte. When these are the same, the ion moving mechanism contained in the electrolyte and the electrode material is unified and moving of ion between the electrolyte and the electrodes can be performed smoothly and, as a result, a battery with a higher output and a higher capacity can be obtained. In this case, the same inorganic substance comprising a lithium ion conductive crystalline or glass-ceramics means an inorganic substance comprising a lithium ion conductive crystalline or a glass-ceramics which has the same crystal phase. Since the inorganic substance comprising a lithium ion conductive crystalline or the glass-ceramics which functions mainly to move ion in the electrodes has the same ion moving mechanism as the inorganic substance comprising a lithium ion conductive crystalline or the glass-ceramics contained in the electrolyte, all ion moving paths in the battery are equalized and, as a result, obstacle to moving of ion becomes small.

As the binder used in case of manufacturing the positive electrode compound and/or the negative electrode compound by mixing and binding the active material and the conduction additives, PVdF, PTFE and SBR rubber may be used but an ion conductive binder may preferably be used, for it will impart ion conductivity.

Ion conductive binders include polymer materials such, for example, as polyethylene oxide, polypropylene oxide, fluoride resins (e.g., polyolefin, polytetrafluoroethylene, polychlorotrifluoroethylene and polyvinylidene fluoride), polyamides, polyesters, polyacrylate and copolymers, bridge structures and mixtures thereof. It is also possible to increase ion conductivity of these materials by adding desired lithium salts such, for example, as $LiBF_4$, $LiSO_3CF_3$, $LiSO_3CH_3$, $LiN(SO_2OFs)_2$, $LiN(SO_2C_2F_5)_2$, $LiC(SO_2CF_3)_3$ and organic ion type polysulfide.

EXAMPLES

Description will now be made about specific examples of the solid electrolyte comprising the inorganic substance comprising a lithium ion conductive crystalline or the solid electrolyte comprising the lithium ion conductive glass-ceramics, and the lithium ion secondary battery employing such solid electrolyte made according to the present invention. Description will also be made about a comparative example for explaining about advantages of the examples of the present invention. The present invention, however, is not limited to these examples but modifications may be made within a spirit and scope of the present invention.

Example 1

Preparation of Lithium Ion Conductive Glass-Ceramics

Raw materials of $H_3PO_4$, $Al(POs)_3$, $Li_2CO_3$, $SiO_2$ and $TiO_2$ were weighed and mixed uniformly to make a composition of 35.0% $P_2O_5$, 7.5% $Al_2O_3$, 15.0% $Li_2O$, 38.0% $TiO_2$ and 4.5% $SiO_2$ expressed in mol % on oxide basis. The mixture was put in a platinum pot and was heated and melted in an electric furnace at 1500° C. for three hours while the molten glass was stirred. Then, the molten glass was formed to a thin plate having a thickness of 0.3 mm by a molding machine made of stainless steel and thereafter the thin plate of glass was heated at 950° C. for twelve hours for crystallization thereby to produce a thin plate made of glass-ceramics.

On the other hand, the molten glass of the same composition was dropped into flowing water to produce flakes of glass. The glass was heated at 950° C. for twelve hours for crystallization and the target glass-ceramics were thereby obtained. The flakes of glass-ceramics thus obtained were crushed by a ball mill to provide fine powder A of glass-ceramics having average particle diameter of 1.5 μm and maximum particle diameter of 7 μm. This fine powder A was further crushed by a wet ball mill to provide slurry B comprising fine powder of glass-ceramics having average particle diameter of 0.2 μm and maximum particle diameter of 0.3 μm. By powder X-ray diffraction, it was confirmed that the predominant crystal phase precipitating was $Li_{i+\chi+y}Al_x Ti_{2-x}Si_yp_{3-y}0i_2$ ($o \leqq x \leqq 0.4$, $0 < y \leqq 0.6$).

Preparation of Solid Electrolyte

The thin plate of glass-ceramics thus obtained was ground to thickness of 40 μm and subjected to stamping to stamp out a solid electrolyte having a diameter of 16 mm.

Preparation of a Positive Electrode

As an active material of the positive electrode, a commercially available $LiCo\theta2$ (average particle diameter of 6 μm) was used This active material of the positive electrode was mixed with acetylene black (average particle diameter of 50 nm) added as an electron conduction additive in an amount of 5 mass % of the active material, and a binder which is a copolymer of polyethylene oxide and polypropylene oxide added with LiBF4 by a vacuum stirring type defoamer in an ethanol solvent. This mixture was coated uniformly on an aluminum sheet having thickness of IQ μm which constituted a positive electrode collector and was dried at 120° C. to produce a positive electrode compound. This positive electrode compound had thickness of 30 μm The positive electrode compound was subjected to stamping to stamp out a positive electrode having a diameter of 15 mm.

Preparation of a Negative Electrode

As a negative electrode, a commercially available graphite powder (average particle diameter of 10 μm) was used. This negative electrode material was mixed with a binder which is a copolymer of polyethylene oxide and polypropylene oxide added with $LiBF_4$ by a vacuum stirring type defoamer in an ethanol solvent. This mixture was coated on a copper sheet having thickness of 12 μm which constituted a negative electrode collector and was dried at 120° C. to produce a negative electrode compound in the form of a sheet. This negative electrode compound had thickness of 20 μm. The negative electrode compound was subjected to stamping to stamp out a positive electrode having a diameter of 15 mm.

Assembly of a Battery

Figure 1:
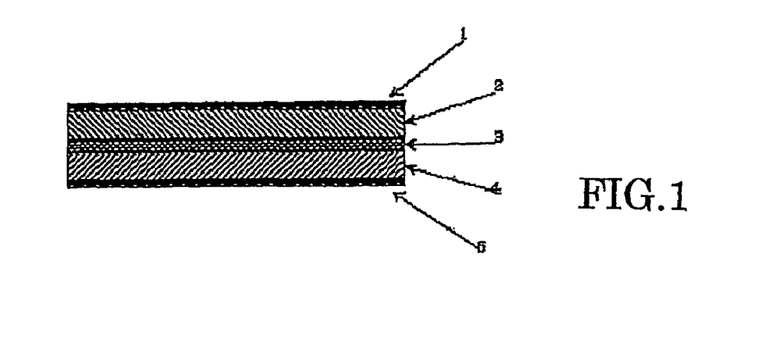
FIG. 1 is a schematic sectional view showing an internal structure of a lithium ion secondary battery made according to the invention.
Figure 2:
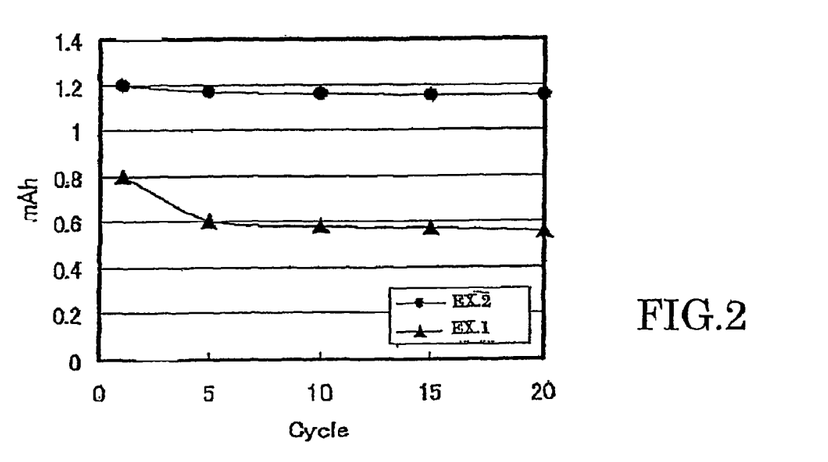
FIG. 2 is a graph showing change in the discharging characteristic accompanying the charging-discharging cycle of a lithium ion secondary battery obtained in Examples 1 and 2.

The positive electrode, the solid electrolyte and the negative electrode were superposed one upon another, pressed by uniaxial pressing at 150° C. in dry atmosphere, and enclosed in a coin cell. The internal structure of this battery is shown in the section of FIG. 1. In FIG. 1, reference character 1 designates a positive electrode collector, 2 a positive electrode compound, 3 a solid electrolyte, 4 a negative electrode compound and 5 a negative electrode collector.

A charging-discharging measurement was made with respect to the assembled battery under conditions of a room temperature of 25° C., constant current of 100 β A/cm$^2$, cut-off voltage of 4.2V for charging and 3.0V for discharging. Initial discharging capacity was 0.8 OmAh and discharging capacity after repeating of 20 cycles was 0.56 mAh which was 70% of the initial discharging capacity.

Example 2

The slurry B of the glass-ceramics fine powder obtained in Example 1 was added to a positive electrode active material and a negative electrode active material in an amount of 20 mass % respectively of the positive electrode active material and the negative electrode active material. A battery was assembled in the same manner as in Example 1 in all other respects. A charging-discharging measurement was conducted under the same conditions as in Example 1. Initial discharging capacity was 1.2 OmAh and discharging capacity after repeating of 20 cycles was 1.15 mAh which was 96% of the initial discharging capacity.

In Examples 1 and 2, the initial discharging capacity was large and deterioration in the capacity accompanying the charging-discharging cycle was small. Example 2 in which the lithium ion conductive glass-ceramics was added to the positive and negative electrodes exhibited particularly excellent values.

Example 3

Preparation of a Solid Electrolyte

The glass-ceramics powder A obtained in Example 1 was mixed with 5 mass % of $LisPO_4$ and the mixture was formed to pellets having a diameter of 20 mm by using a cold isostatic press (CIP). The formed pellets were sintered by using a hot isostatic press (HIP) and the sintered product was ground and polished to a solid electrolyte having a diameter of 16 mm and thickness of 0.08 mm. In sintering the pellets, liquid phase sintering was used by which $LIsPO_4$ was melted and the glass-ceramics powder was bound by the melted $LisPO4$.

Preparation of a Positive Electrode

In preparing a positive electrode compound, a commercially available fluidized granulator was used. Ketjen black (average particle diameter of 40 nm) added as an electron conduction additive in an amount of 5 mass % of the positive electrode active material, the glass-ceramics powder A (prepared in Example 1) having average particle diameter of 1.5 μm added as an ion conduction additive in an amount of 10 mass % of the positive electrode active material and a binder which was a copolymer of polyethylene oxide and polypropylene oxide added with LiTFSI were mixed in an ethanol solvent to prepare a spray suspension.

As an active material of the positive electrode, a commercially available $LiMmO_4$ (average particle diameter of 10 μm) was used This active material of the positive electrode was put in a fluidized granulator and the adjusted spray suspension was sprayed over the active material flowing at 90° C. and ethanpl solvent was evaporated to fix the electron conduction additive and the ion conduction additive on the surface of the particles of the active material. This surface covered positive electrode compound was dispersed again by using ethanol and coated uniformly over an aluminum sheet having thickness of 20 μm which was a positive electrode collector. The positive electrode compound then was dried at 120° C. to provide a positive electrode. The positive electrode which had thickness of S$\delta$μm was subjected to stamping to stamp out a positive electrode having a diameter of 15 mm.

Preparation of a Negative Electrode

In preparing a negative electrode compound, the same commercially available fluidized granulator as used in preparing the positive electrode compound was used. Ketjen black (average particle diameter of 40 nm) added as an electron conduction additive in an amount of 5 mass % of the negative electrode active material, the glass-ceramics powder. A (prepared in Example 1) having average particle diameter of 1.5 μm added as an ion conduction additive in an amount of 10 mass % of the negative electrode active material and a binder which was a copolymer of polyethylene oxide and polypropylene oxide added with LiTFSI were mixed in an ethanol solvent to prepare a spray suspension.

As an active material of the negative electrode, a commercially available $Li4Ti_5Oi2$ which was granulated to pellets having average particle diameter of 3 μm was used This active material of the negative electrode was put in the fluidized granulator and the adjusted spray suspension was sprayed over the active material flowing at 90° C. and ethanol solvent was evaporated to fix the electron conduction additive and the ion conduction additive on the surface of the particles of the active material. This surface covered negative electrode compound was dispersed again by using ethanol and coated uniformly over an copper sheet having thickness of 18 μm which was a negatiye electrode collector. The negative electrode compound then was dried at 120° C. to provide a negative electrode. The negative electrode which had thickness of 25 μm was subjected to stamping to stamp out a negative electrode having a diameter of 15 mm.

Assembly of a Battery

The positive electrode, the solid electrolyte and the negative electrode were superposed one upon another, pressed by uniaxial pressing at 150° C. in dry atmosphere, and enclosed in a coin cell.

A charging-discharging measurement was made with respect to the assembled battery under conditions of a room temperature of 25° C., constant current of 60 μA/cm$^2$, cut-off voltage of 4.0V for charging and 3.0V for discharging. Initial discharging capacity was 0.95 mAh and discharging capacity after repeating of 20 cycles was 0.76 mAh which was 70% of the initial discharging capacity.

Example 4

Instead of the glass-ceramics fine powder A used for the positive and negative electrodes of Example 3, the slurry B of the glass-ceramics fine powder obtained in Example 1 was added to a positive electrode active material and a negative electrode active material in an amount of 5 mass % respectively of the positive electrode active material and the negative electrode active material. A battery was assembled in the same manner as in Example 3 in all other respects. A charging-discharging measurement was conducted under the same conditions as in Example 3. Initial discharging capacity was 1.43 mAh and discharging capacity after repeating of 20 cycles was 1.3 lmAh which was 92% of the initial discharging capacity.

Figure 3:
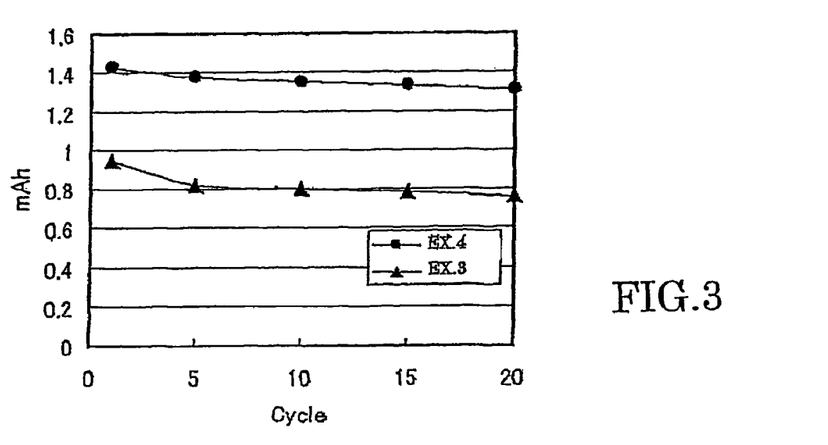
FIG. 3 is a graph showing change in the discharging characteristic accompanying the charging-discharging cycle of a lithium ion secondary battery obtained in Examples 3 and 4.

Change in the discharging capacity accompanying the charging-discharging cycle of Examples 3 and 4 is shown in FIG. 3. In Examples 3 and 4, the initial discharging capacity was large and deterioration in the capacity accompanying the charging-discharging cycle was small. Example 4 in which the lithium ion conductive glass-ceramics added to the positive and negative electrodes had a smaller particle diameter exhibited particularly excellent values.

Example 5

Preparation of a Positive Electrode

In preparing a positive electrode compound, a commercially available spray drier was used. Cobalt-substituted $LiNio.sCoo.2O2$ (average particle diameter of 3 μm) added as an active material of the positive electrode, carbon nanofiber (average particle diameter of 80 nm) added as an electron conduction additive in an amount of 2 mass % of the positive electrode active material, $Si\theta2$ fine powder having average particle diameter of 50 nm added as an ion conduction additive in an amount of 4 mass % of the positive electrode active material, and a binder which was a copolymer of polyethylene oxide and polypropylene oxide added with LiTFSI were mixed in a solvent consisting of a mixture of methanol and ethanol to prepare a spray suspension.

This mixture was stirred and spray dried by the spray drier to evaporate the solvent and thereby fix the electron conduction additive and the ion conduction additive on the surface of the particles of the active material. This surface covered positive electrode compound was dispersed again by using ethanol and coated uniformly over an aluminum sheet having thickness of 20 μm which was a positive electrode collector. The positive electrode compound then was dried at 120° C. to provide a positive electrode. The positive electrode which had thickness of 40 μm was subjected to stamping to stamp out a positive electrode having a diameter of 15 mm.

Preparation of a Negative Electrode

In preparing a negative electrode compound, the same commercially available spray drier as was used in preparing the positive electrode was used. A commercially available $Li4TisOi2$ granulated to average particle diameter of 3 μm added as an active material of the negative electrode, carbon nanofiber (average particle diameter of 80 nm) added as an electron conduction additive in an amount of 2 mass % of the negative electrode active material, $Si\theta2$ fine powder having average particle diameter of 50 nm added as an ion conduction additive in an amount of 3 mass % of the negative electrode active material, and a binder which was a copolymer of polyethylene oxide and polypropylene oxide added with LiTFSI were mixed in a solvent consisting of a mixture of methanol and ethanol to prepare a spray suspension.

This mixture was stirred and spray dried by the spray drier to evaporate the solvent and thereby fix the electron conduction additive and the ion conduction additive on the surface of the particles of the active material. This surface covered positive electrode compound was dispersed again by using ethanol and coated uniformly over a copper sheet having thickness of 18 μm which was a negative electrode collector. The negative electrode compound then was dried at 120° C. to provide a negative electrode. The negative electrode which had thickness of 40 μm was subjected to stamping to stamp out a negative electrode having a diameter of 15 mm.

Assembly of a Battery

The positive electrode, the solid electrolyte prepared in Example 4 and the negative electrode were superposed one upon another, pressed by uniaxial pressing at 150° C. in dry atmosphere, and enclosed in a coin cell.

A charging-discharging measurement was made with respect to the assembled battery under conditions of a room temperature of 25° C., constant current of 60 μA/cm$^2$, cut-off voltage of 4.0V for charging and 3.0V for discharging. Initial discharging capacity was 0.58 mAh and discharging capacity after repeating of 20 cycles was 0.46 mAh which was 80% of the initial discharging capacity.

Example 6

Instead of the SiO$\theta$2 fine powder having average particle diameter of 50 nm used for the positive and negative electrodes of Example 5, the slurry B of the glass-ceramics fine powder obtained in Example 1 was added as an ion conduction additive to a positive electrode active material in an amount of 4 mass % of the positive electrode active material and to a negative electrode active material in an amount of 3 mass % of the negative electrode active material. A battery was assembled in the same manner as in Example 5 in all other respects. A charging-discharging measurement was conducted under the same conditions as in Example 5. Initial discharging capacity was 2.18 mAh and discharging capacity after repeating of 20 cycles was 2.07 mAh which was 95% of the initial discharging capacity.

Figure 4:
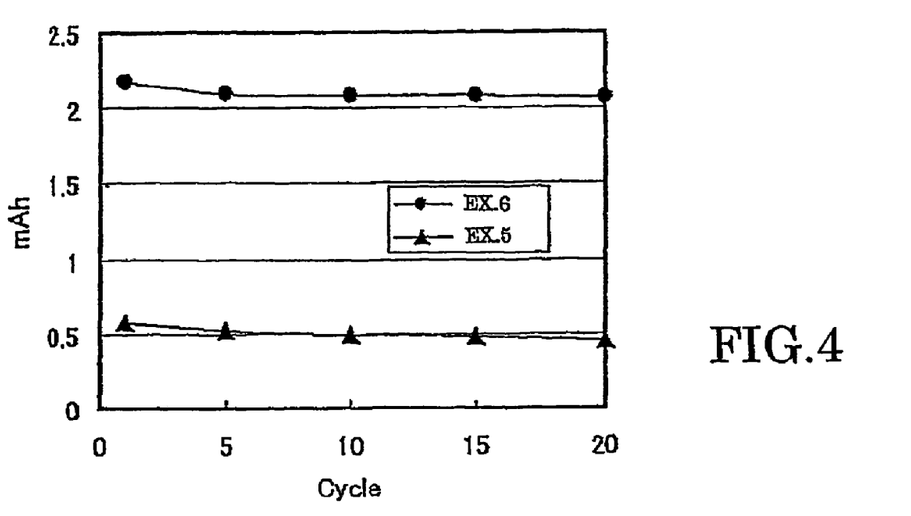
FIG. 4 is a graph showing change in the discharging characteristic accompanying the charging-discharging cycle of a lithium ion secondary battery obtained in Examples 5 and 6.

Change in the discharging capacity accompanying the charging-discharging cycle of Examples 5 and 6 is shown in FIG. 4. In Examples 5 and 6, the initial discharging capacity was large and deterioration in the capacity accompanying the charging-discharging cycle was small. Example 6 in which the lithium ion conductive glass-ceramics was added to the positive and negative electrodes exhibited particularly excellent values.

Example 7

Preparation of a Positive Electrode

As an active material of a positive electrode, commercially available LiCoθ2 (average particle diameter of 6 μm) was used. In preparing the positive electrode, a high-speed processing apparatus was used. LiCoθ2 was mixed at a high speed of 5000 rpm. An ethanol solvent in which Ketjen black (average particle diameter of 40 nm) added as an electron conduction additive in an amount of 5 mass % of the positive electrode active material and a binder of a copolymer of polyethylene oxide and polypropylene oxide added with LiBF4 which was added in an amount of 9 mass % of the positive electrode active material material were dispersed was sprayed little by little over the positive electrode active material to enable the electron conduction additive to be attached to the positive electrode active material. The materials was dried in vacuum at 120° C. to provide a positive electrode compound.

Preparation of a Negative Electrode

A metal Li foil having thickness of 0.2 mm on which a Cu film was formed by sputtering was subjected to stamping to stamp out a negative electrode having a diameter of 15 mm.

Assembly of a Battery

The positive electrode, the solid electrolyte prepared in Example 4 and the negative electrode were superposed one upon another, pressed by uniaxial pressing at 150° C. in dry atmosphere, and enclosed in a coin cell.

A charging-discharging measurement was made with respect to the assembled battery under conditions of a room temperature of 25° C., constant current of 0.1 mA/cm$^2$, cut-off voltage of 4.2V for charging and 3.0V for discharging. Initial discharging capacity at 25° C. was 2.9 mAh and discharging capacity after repeating of 20 cycles was 2.5 mAh which was 85% of the initial discharging capacity. Initial discharging capacity at 80° C. was 4.2 mAh and discharging capacity after repeating of 20 cycles was 3.9 mAh which was 90% of the initial discharging capacity.

Example 8

In the battery of Example 7, the slurry B of the glass-ceramics fine powder obtained in Example 1 was added to a positive electrode in an amount of 7 mass % of the positive electrode active material and the amount of the copolymer of polyethylene oxide and polypropylene oxide added with LiBF4 was changed to 2 mass % of the positive electrode active material. A battery was assembled in the same manner as in Example 7 in all other respects. A charging-discharging measurement was conducted under the same conditions as in Example 7. Initial discharging capacity at 25° C. was 4.1 mAh and discharging capacity after repeating of 20 cycles was 3.9 mAh which was 95% of the initial discharging capacity. Initial discharging capacity at 80° C. was 4.5 mAh and discharging capacity after repeating of 20 cycles was 4.1 mAh which was 90% of the initial discharging capacity.

Discharging capacity of Example 7 is compared with that of Example 8 in Table 1. Example 8 in which the positive electrode comprises lithium ion conductive glass-ceramics exhibited particularly excellent values at the room temperature of 25° C.

TABLE 1

| | Example 8 | | Example 7 | |
| | Measuring temperature | | | |
| | 25° C. | 80° C. | 25° C. | 80° C. |
| Initial discharging capacity | 4.1 mAh | 4.5 mAh | 2.9 mAh | 4.2 mAh |
| Discharging capacity after 20 cycles | 3.9 mAh | 4.1 mAh | 2.5 mAh | 3.9 mAh |

Comparative Example

Preparation of a Solid Electrolyte

LiI which is an ion conductive ceramic was crushed to particles having an average particle diameter of 2 μm and was formed to pellets having a diameter of 20 mm by using a cold isostatic press. The formed pellets were sintered at 350° C. and ground and polished to a solid electrolyte having a diameter of 16 mm and thickness of 0.08 mm.

Assembly of a Battery

The same positive electrode as prepared in Example 7, the solid electrolyte prepared in the above described manner and the same negative electrode as prepared in Example 7 were superposed one upon another, pressed by uniaxial pressing, and enclosed in a coin cell.

A charging-discharging measurement was made with respect to the assembled battery under conditions of a room temperature of 25° C., constant current of 0.1 mA/cm$^2$, cut-off voltage of 4.2V for charging and 3.0V for discharging. Initial discharging capacity at 25° C. was 1.1 mAh and discharging capacity after repeating of 20 cycles was 0.3 mAh, showing a substantial drop in the capacity.

As described above, the lithium ion secondary battery comprising a lithium ion conductive glass-ceramics made according to the present invention has, notwithstanding that it is a fully solid battery which does not contain an organic electrolytic solution, a high output and excellent charging-discharging cycle characteristics.

INDUSTRIAL APPLICABILITY

The electrolyte of the present invention comprising lithium ion conductive glass-ceramics has high lithium ion conductivity and is electrochemically very stable and, therefore, it can be used not only for a lithium ion secondary battery but for a lithixym primary battery, an electrochemical capacitor—called a hybrid capacitor, a dye sensitized solar cell, and other electrochemical elements using lithium ion as a charge transfer carrier. Some examples of such electrochemical elements will be described below.

By attaching a desired sensitive electrode to the electrolyte, the electrolyte can be used for various gas sensors and other detectors. For example, by using carbonate as an electrode, it can be used as a carbon dioxide gas sensor. By using nitrate as an electrode, it can be used as a $NO_x$ sensor. By using sulfate as an electrode, it can be used as a $SO_x$ sensor. By assembling the electrolyte in an electrolytic cell, it can be used as an electrolyte for decomposing and catching $NO_x$ and $SO_x$ in exhaust gas.

By attaching an inorganic or organic compound which is colored or changes its color by insertion or removal of lithium ion to the electrolyte, and attaching a transparent electrode such as ITO thereto, an electrochromic device can be composed whereby an electrochromic display of a small power consumption having a memory function can be provided.

Since the ion conduction path of the electrolyte of the present invention has an optimum size for passing lithium ion, it can pass lithium ion selectively when alkali ion other than lithium ion also exists. The electrolyte therefore can be used as a partition of a lithium ion selective collection device or a partition of a lithium ion selection electrode. Since the speed of passing of lithium ion is higher as the mass of the ion is smaller, the electrolyte can be used for separating isotope of lithium ion. This enables concentration and separation of 6Li concentrate (7.42% in the ratio existing in nature) which is necessary for a blanket material for producing tritium which is a fuel of a fusion reactor.

Since the lithium ion conductive glass-ceramics powder contained in the electrolyte and electrodes has high lithium ion conductivity and is electrochemically very stable, it can be utilized as additive for imparting ion conductivity, anti-static purposes and controlling surface potential etc. by mixing the glass-ceramics powder in other resins or coating materials.

The invention claimed is:

1. A solid electrolyte comprising sintered inorganic substance powder comprising a lithium ion conductive crystalline said sintered inorganic substance powder being in an amount within a range from 50 mass % to 98 mass %,
    wherein said solid electrolyte is substantially free of an organic substance and an electrolytic solution, and
    said solid electrolyte has a thickness of 25 µm or over.

2. A solid electrolyte as defined in claim 1 wherein the inorganic substance powder comprising a lithium ion conductive crystalline is substantially free of a pore or a crystal grain boundary which obstructs ion conduction.

3. A solid electrolyte as defined in claim 1 wherein the inorganic substance powder comprising a lithium ion conductive crystalline is lithium ion conductive glass-ceramics.

4. A solid electrolyte as defined in claim 1 comprising an inorganic substance powder comprising a lithium ion conductive crystalline and an inorganic substance comprising Li.

5. A solid electrolyte as defined in claim 4 wherein the inorganic substance powder comprising a lithium ion conductive crystalline has ion conductivity of $10^{-4}$ Scm$^{-1}$ or over, has an average particle diameter of 9 µm or below.

6. A solid electrolyte as defined in claim 3 wherein the ion conductive glass-ceramics are in the form of a thin plate.

7. A solid electrolyte as defined in claim 1 having ion conductivity which is $10^{-5}$ Scm$^{-1}$ or over.

8. A solid electrolyte as defined in claim 1 wherein the inorganic substance powder comprising a lithium ion conductive crystalline has a predominant crystal phase of $Li_{1+x+y}Al_xTi_{2-x}Si_yP_{3-y}O_{12}$ where $0 \leq x \leq 1$ and $0 \leq y \leq 1$.

9. A solid electrolyte as defined in claim 1 wherein the inorganic powder substance comprising a lithium ion conductive crystalline comprises, in mol %;

| | |
|---|---|
| $Li_2O$ | 12-18% |
| $Al_2O_3 + Ga_2O_3$ | 5-10% |
| $TiO_2 + GeO_2$ | 35-45% |
| $SiO_2$ | 1-10% |
| | and |
| $P_2O_5$ | 30-40%. |

10. A solid electrolyte as defined in claim 1 wherein the inorganic substance powder comprising a lithium ion conductive crystalline comprises, in mass %;

| | |
|---|---|
| $Li_2O$ | 3-10% |
| $Al_2O_3 + Ga_2O_3$ | 5-20% |
| $TiO_2 + GeO_2$ | 25-40% |
| $SiO_2$ | 0.5-8% |
| | and |
| $P_2O_5$ | 40-55%. |

11. A lithium ion secondary battery comprising a solid electrolyte as defined in claim 1.

12. A lithium ion secondary battery as defined in claim 11 comprising an inorganic substance comprising a lithium ion conductive crystalline in a positive electrode and/or a negative electrode.

13. A lithium ion secondary battery as defined in claim 12 wherein the inorganic substance comprising a lithium ion conductive crystalline contained in the positive electrode and/ or the negative electrode is substantially free of a pore or a crystal grain boundary which obstructs ion conduction.

14. A lithium ion secondary battery as defined in claim 12 wherein the inorganic substance comprising a lithium ion conductive crystalline contained in the positive electrode and/or the negative electrode is a lithium ion conductive glass-ceramics.

15. A lithium ion secondary battery as defined in claim 12 wherein an average particle diameter of the inorganic substance comprising a lithium ion conductive crystalline contained in the positive electrode and/or the negative electrode is ⅕ or below of an average particle diameter of an active material of the positive electrode and/or the negative electrode comprising an inorganic substance comprising a lithium ion conductive crystalline.

16. A lithium ion secondary battery as defined in claim 12 wherein an amount of the inorganic substance comprising a lithium ion conductive crystalline contained in the positive electrode and/or the negative electrode is 2-35 mass % of an active material of the positive electrode and/or the negative electrode.

17. A lithium ion secondary battery as defined in claim 12 wherein the inorganic substance comprising a lithium ion conductive crystalline contained in the positive electrode and/or the negative electrode comprises, in mol %;

| | |
|---|---|
| $Li_2O$ | 12-18% |
| $Al_2O_3 + Ga_2O_3$ | 5-10% |
| $TiO_2 + GeO_2$ | 35-45% |
| $SiO_2$ | 1-10% and |
| $P_2O_5$ | 30-40%. |

18. A lithium ion secondary battery as defined in claim 12 wherein the inorganic substance comprising a lithium ion conductive crystalline contained in the positive electrode and/or the negative electrode comprises, in mass %;

| | |
|---|---|
| $Li_2O$ | 3-10% |
| $Al_2O_3 + Ga_2O_3$ | 5-20% |
| $TiO_2 + GeO_2$ | 25-40% |
| $SiO_2$ | 0.5-8% and |
| $P_2O_5$ | 40-55%. |

19. A lithium ion secondary battery as defined in claim 12 wherein the inorganic substance comprising a lithium ion conductive crystalline contained in the positive electrode and/or the negative electrode has a predominant crystal phase of $Li_{1+x+y}Al_xTi_{2-x}Si_yP_{3-y}O_{12}$ where $0 \leq x \leq 1$ and $0 \leq y \leq 1$.

20. A lithium ion secondary battery as defined in claim 12 which comprises, in the positive electrode and/or the negative electrode, the same inorganic substance as the inorganic substance comprising a lithium ion conductive crystalline contained in the solid electrolyte.

* * * * *